(12) United States Patent
Veits

(10) Patent No.: US 8,107,358 B2
(45) Date of Patent: Jan. 31, 2012

(54) METHOD, COMPUTER PROGRAM PRODUCT, AND NETWORK NODE ELEMENT FOR MORE QUICKLY DETECTING FAULTS ON TRANSMISSION PATHS AND/OR IN NODES

(75) Inventor: Oliver Veits, Dachau (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 445 days.

(21) Appl. No.: 11/918,298

(22) PCT Filed: Apr. 4, 2006

(86) PCT No.: PCT/EP2006/061304
§ 371 (c)(1),
(2), (4) Date: Oct. 11, 2007

(87) PCT Pub. No.: WO2006/108776
PCT Pub. Date: Oct. 19, 2006

(65) Prior Publication Data
US 2009/0067321 A1  Mar. 12, 2009

(30) Foreign Application Priority Data
Apr. 13, 2005 (DE) .......... 10 2005 017 021

(51) Int. Cl.
*H04L 1/00* (2006.01)

(52) U.S. Cl. .............................. 370/217; 370/400
(58) Field of Classification Search .................. None
See application file for complete search history.

(56) References Cited

U.S. PATENT DOCUMENTS

| 6,392,989 | B1 | 5/2002 | Jardetzky et al. | |
|---|---|---|---|---|
| 7,334,047 | B1* | 2/2008 | Pillay-Esnault | 709/242 |
| 2002/0186658 | A1* | 12/2002 | Chiu et al. | 370/237 |
| 2006/0078333 | A1* | 4/2006 | Uga et al. | 398/26 |
| 2006/0215547 | A1* | 9/2006 | Koppol | 370/220 |
| 2009/0067321 | A1* | 3/2009 | Veits | 370/217 |

FOREIGN PATENT DOCUMENTS
DE   103 34 632 A1   3/2005
* cited by examiner

*Primary Examiner* — Jianye Wu

(57) ABSTRACT

A communication between network node elements (routers), according to which the routes communicate with one another using a link-state protocol, e.g. IS-IS or OSPF and the failure of a network node element can be identified more rapidly than by the evaluation of hello messages disclosed in prior art is provided. A link-state message is received by a first network node element from a neighboring second network node element, the link states that are contained in the link-state message are compared with at least one stored link state of a network node element that lies adjacent to the first network node element and the compared link states are evaluated as a criterion for a failure of a neighboring network node element. The topology is recalculated, taking into consideration the failure of the neighboring network node element, without waiting for a dead interval based on period link (hello) message to elapse.

15 Claims, 1 Drawing Sheet

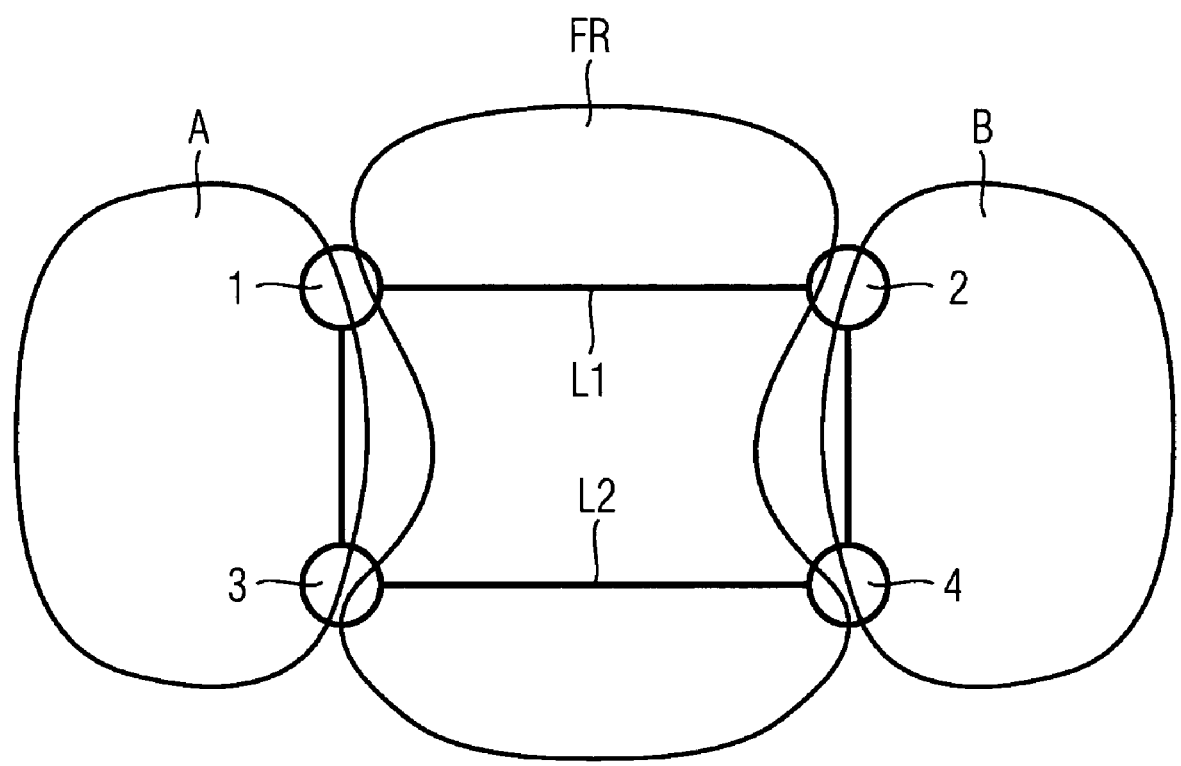

METHOD, COMPUTER PROGRAM PRODUCT, AND NETWORK NODE ELEMENT FOR MORE QUICKLY DETECTING FAULTS ON TRANSMISSION PATHS AND/OR IN NODES

CROSS REFERENCE TO RELATED APPLICATIONS

This application is the US National Stage of International Application No. PCT/EP2006/061304, filed Apr. 4, 2006 and claims the benefit thereof. The International Application claims the benefits of German application No. 102005017021.8 DE filed Apr. 13, 2005, both of the applications are incorporated by reference herein in their entirety.

FIELD OF INVENTION

The invention relates to a method for communicating between network node elements, routers in particular, wherein information about a network node element's complete or partial outage or malfunctioning is conveyed to neighboring network node elements.

BACKGROUND OF INVENTION

Network elements that at least partially perform path routing functions of a switching computer are referred to also as network node elements. One widely familiar network node element is what is termed the router.

A router conveys arriving data packets over further network node elements or routers to a provided network element in a destination network requiring to be determined. A router determines an optimal path to the destination network element when data packets arrive, with said path possibly traversing further network node elements or routers. A suitable interface via which the data packets are to be forwarded is in connection therewith selected in the router. For that purpose the router utilizes a locally provided routing table. The entries in said table can be static or dynamic. Static entries are made by a network administrator, whereas dynamic entries are created and modified during ongoing operation. The dynamic entries are therein created and modified using what are termed routing protocols.

Routing protocols serve to exchange routing information; they allow the routers to structure their routing tables dynamically and to adjust them in response to altered conditions. A major instance of altered conditions is therein a complete or partial outage of the router. An outage of said type of a neighboring router is referred to also as a "neighbor down". A partial outage can affect, for example, a single interface of the router whose other interfaces remain intact, whereas a complete outage will disable all the router's functions.

The term "outage" below encompasses both partial complete outages. The term "router" is for ease of understanding furthermore applied below to network node elements in general without thereby restricting what is under consideration to a router's specific embodiment.

SUMMARY OF INVENTION

When a plurality of routers are combined or are linked to what is termed a broadcast medium such as, for instance, an Ethernet switch, the outage of one router poses the problem of notifying the linked neighboring routers that the router having suffered an outage is no longer operable.

Solutions to said problem that have been known hitherto from the prior art provide for the neighboring routers' exchanging messages with each other that indicate a router's operability and in whose absence an outage of the router can be determined. Messages having the aforementioned purpose that are conveyed at recurring time intervals are referred to frequently also as "hello messages". Hello messages are provided in known routing protocols such as, for instance, OSPF (Open Shortest Path First) and IS-IS (Intermediate System to Intermediate System Protocol).

Both being examples of what are termed "link state protocols", the routing protocols OSPF and IS-IS number among the routing protocols that serve to establish a topology database. With routing that employs link state protocols, if changes occur in the packet-oriented network then what are termed link state advertisements or link state announcements (LSA) will be sent in the network. A network is mapped in a topology database based on the surrounding network node elements' or routers' LSAs, as a result of which each router will know the entire neighboring topology. As changes are usually conveyed immediately or "instantly" to all routers in the network, LSA routing protocols exhibit good "convergence", which is to say they have a fast dynamic adjustment characteristic with reference to changes in the network topology.

The OSPF protocol controls the conveying of information about the availability of connection paths between packet-oriented networks and supports, in particular, hierarchical network structures. It is characterized by fast convergence. The OSPF's central element is the topology database containing a list of all routers and their connections or "links". An exchange of LSAs between neighboring routers is provided for setting up and maintaining the topology database.

The IS-IS protocol is another link state protocol. As first IS-IS implementations by the company Cisco Systems Inc., San Jose, Calif., USA were far more robust than the OSPF implementations, mainly the IS-IS protocol was employed by many network operators.

The already described exchange of hello messages for continuously indicating operability is in the case of link state protocols usually performed periodically with a time interval of 10 seconds between two hello messages. When a 10-second interval has been set, then on expiration of a certain, usually 40-second, tolerance period—also called the "dead interval"—an outage of a neighboring second router will be assumed by a first router if no further hello messages have during said period arrived at the first router from the second router. It is in that state then assumed that the neighboring router is no longer available.

Thus 40 seconds elapse in the case of customary dead-interval settings before an outage is determined by the cited link state protocols following an outage of a router or an interface thereof and before measures can be initiated aimed at replacing the operations performed hitherto by the routed having suffered an outage with operations performed by an intact neighboring router in order, given a level of connection path redundancy customary in packet-oriented networks, to restore an availability of all network node elements in the packet-oriented network. The adjustment characteristic—the time taken to adjust to changes in the network topology—is also called the "convergence time".

Since adjusting cannot begin at all until the outage has been determined, meaning until after the dead interval has expired, the convergence time associated with the cited methods is very long and hence unacceptable in many areas of application.

To shorten the convergence time it has been proposed shortening the time interval between two hello messages, which is to say to set a corresponding timer provided for defining the time interval in each router to a shorter time value.

A measure of such kind will, though, increase both each router's compute load associated with intensified processing of the hello messages and also the network load throughout the packet-oriented network, in particular in cases in which the time taken to detect an operational outage of a neighboring router is to be reduced to within a millisecond range.

The object of the invention is to shorten the convergence time after a router has suffered an outage but at the same time to largely maintain a router's compute load and/or the network load in the packet-oriented network at a low level.

Said object is achieved by means of a method having the features of the independent claims.

Inventively provided is a method for communicating between network node elements wherein said elements communicate with each other using a link state protocol. Said method starts with the reception at a first network node element of a link state message from a neighboring second network node element. Link state messages of said type are in a link state protocol or, as the case may be, link state routing protocol provided periodically or following a link state change. Link states contained in the link state message are compared with at least one stored link state of a network node element that is a neighbor of the first network node element. The stored link states of all neighboring network node elements are usually kept in a topology database maintained locally in the first network node element under consideration or else centrally elsewhere in the packet-oriented network under consideration. The compared link states are finally evaluated. If the evaluation indicates that either the second network node element or another network node element has a missing link state, then that will be applied as a criterion for an outage of a neighboring network node element. It can in that case be assumed in the network node element under consideration that the neighboring router is no longer available.

A major advantage of the invention lies in applying the link states—instead of an evaluation of periodic hello messages as practiced hitherto in the prior art—as a criterion for an outage of neighboring network elements. The network node element embodied having the inventive means will thus not have to await expiration of the above-described customary 40-second dead interval in order to adjust to an outage of a neighboring network node element and to recalculate the topology on the basis of the shortest path and revise the routing tables. Applying the inventive method will thus advantageously enable the loss of a link to one or more neighboring routers to be detected within a much shorter time interval. Time intervals within the millisecond range can advantageously be realized without burdening a router requiring to be checked with a multiplicity of hello messages.

The inventive method will advantageously allow complete outages of a network node element to be evaluated as well as interface outages of a network node element that is otherwise still intact.

A network node element having suffered a complete outage will obviously no longer be able to send link state messages. The inventive method is not, however, limited within the scope of detecting the loss of a link to said network element to merely determining that a link state message actually due to appear has long failed to do so and that the associated network node element must therefore have suffered an outage. Through comparing the link states—associated preferably with several or even all neighboring network node elements—with at least one stored link state of a neighboring network node element it will also be possible for a network node element that has suffered an outage to be detected in link state messages of the neighboring intact network node elements. That is because the link state messages contain not only the link state of the reporting network node element's link to the reported network node element; rather it is the case that the reporting network node element's link state message will contain all the link states of the network node elements that are neighbors of the reporting network node element.

Further embodiment variants are the subject of the subclaims.

Stored link states are customarily kept in a topology database. That is implemented either as a local database in the first network node element or as a central database in a central network element.

According to an advantageous embodiment of the invention a check is performed after the link states contained in the link state message have been compared with those stored to determine if there is an exact match between them. If so, the compared link states will not be evaluated as a criterion for an outage of a neighboring network node element as obviously no change in state will have occurred and evaluating would only use compute capacity unnecessarily.

A further embodiment of the inventive method is characterized in that following an evaluation indicating an outage of a neighboring network node element a topology will be recalculated based on neighboring available network node elements and taking account of the neighboring network node element that has suffered an outage. It will be recalculated—as provided in accordance with the inventive idea—without awaiting expiration of a dead interval on the basis of periodic link ("hello") messages.

BRIEF DESCRIPTION OF THE DRAWINGS

An exemplary implementation offering further advantages as well as embodiments of the invention are explained in more detail below with the aid of a drawing.

The single FIGURE shows a first packet-oriented network A, a second packet-oriented network B, and a network FR that is located between the two networks A, B and which exhibits the property of not automatically leading to a link down on the opposite side of the networks B, A in the event of a link down on one of the two networks A, B. The network FR is formed by, for example, a Frame Relay or an Ethernet switch.

DETAILED DESCRIPTION OF INVENTION

A use of a Frame Relay or Ethernet switch serves to illustrate the inventive method in a practical scenario consisting of a plurality of network types, although they are not functionally necessary for implementing the inventive method.

A first router 1 and a third router 3 are located in the first network A and a second router 2 and a fourth router 4 are located in the second network B. The first router 1 is linked within the first packet-oriented network A to the third router 3. The second router 2 is linked within the second packet-oriented network B to the fourth router 4.

The packet-oriented networks A, B are linked to each other by means of narrowband links L1, L2, as a result of which a link is redundantly implemented between the two packet-oriented networks A, B.

A standard path between the first network A and second network B is set up via the first link L1 between the first router 1 and second router 2. A second link L2 that is redundant with respect to the first standard link L1 insures there will still be a link from the first packet-oriented network A to the second packet-oriented network B should the first standard link L1 suffer an outage.

A periodic conveying of hello messages within the millisecond range is owing to the narrowband nature of the first link L1—which is to say to its having a low bandwidth—not allowed because of a high bandwidth demand associated therewith.

The invention employs an expanded use of a topology database (not shown) contained in many routers or, as the case may be, uses alternative memory structures serving to store LSAs. Information about the link state LSA (link state advertisement) of the neighboring network node elements is taken from the topology database. Said LSAs describe a link state of each router in terms of the common communication medium, for example Ethernet, Frame Relay, ATM, HDLC etc.

A newly received LSA will be checked by a router to determine whether it has been changed relative to the previously received LSA of the neighboring router. If so, a further check will be performed to determine whether according to the data contained in the LSAs there is a no longer existing link from the checked router to the common communication medium.

An outage of an interface (not shown) of the second router 2 to the first router 1 is below first assumed as the starting point.

It is assumed in a first scenario that an interface of the second router 2 to the first router 1 has suffered an outage via the link L1, but that the second router 2 is otherwise still intact. In that case an LSA (link state advertisement) will following the outage of the interface of the second router 2 to the link L1 be sent on all still intact interfaces of the second router 2. Said LSA will be sent in the form of, for instance, a broadcast or multicast message and will initially arrive also at the fourth router 4. Via the fourth router 4, the second link L2, and the third router 3, the LSA that has been sent reaches the first router 1 via the redundant second link L2. The first router 1 can therefore tell immediately that its neighboring second router 2 can no longer be accessed directly.

A complete outage of the second router 2 is the assumed staring point of a second scenario.

In the event of an outage of the second router 2, the fourth router 4 will send an LSA, in whose dataset a link of the second router 2 missing, to the first router 1 via the third router 3. When the LSA is analyzed, the first router 1 will detect that its neighboring second router 2 is no longer accessible.

In an embodiment (not shown) in which the second router 2 is linked to the fourth router 4 via a direct link (optical fiber or cable), the fourth router 4 can detect an outage of the second router 2 faster than can the first router 1 by evaluating a missing hello message. While it is true that a large available bandwidth between the second router 2 and fourth router 4 due to the broadband medium (optical fiber or cable) will make a short time interval possible between sent hello messages without a bandwidth use associated therewith being of any significant consequence, applying the same short time interval between two hello messages on the narrowband link L1 would result in a high level of network loading, which is why the inventive method is more advantageous also in the case of a total outage of the second router 2 here under consideration than is a shorter interval between two hello messages.

A computer program product to operate on a network node element and having instructions to be executed by a processor is also provided. The instructions when executed comprise the steps of: receiving a link state message from a neighboring second network node element by a first network node element; comparing the link state in the link state message with a stored link state of a network node element that is a neighbor of the first network node element; determining whether the link state in the link state message exactly matches the stored link state in response to the comparison; and evaluating the compared link states as a criterion for an outage of a neighboring network node element in response to the evaluating step resulting in a determination that the compared states do not exactly match. The stored link state may be maintained in a topology database.

In the event of an outage of the interface of a router requiring to be checked, link state messages indicating an outage of the corresponding router ("link down" LSA) will reach the former neighboring routers by way of a redundant path through the packet-oriented network.

If a router suffers a complete outage—affecting not just one of its interfaces—, then not only the links to the corresponding neighboring routers will be of relevance but also the LSAs to the other links of the router that has suffered an outage. The router which, from a corresponding first LSA, is the first to detect that its neighboring router has suffered an outage will by way of a second LSA inform the other, still accessible routers in the packet-oriented network accordingly. If LSAs of said type arrive over redundant paths at other formerly neighboring routers of the router that has suffered an outage, then they can immediately assume that their neighboring router is no longer accessible.

It is provided in a further embodiment of the invention for a router, following receipt and evaluation of an LSA indicating an outage of a neighboring router, to conclusively confirm said neighboring router's non-availability by means of one or more hello messages sent thereto. Said hello messages are preferably sent at short intervals. The basic idea underlying said embodiment is that the LSA which, after checking, indicates an outage of a neighboring router will be used as a trigger for sounding out the neighboring router by means of a rapid sequence of hello messages. If, however, the neighboring router responds to the hello messages sent, then the corresponding link state can remain flagged in the topology database as being valid. If the neighboring router fails to respond though, the router performing the check will then be able to assume with even greater certainty that the neighboring router is really no longer able to respond owing to, for example, an outage, and it will then be flagged in the topology database as having suffered an outage or a corresponding entry for the router having suffered an outage will be deleted.

The invention claimed is:

1. A method for communicating between network node elements wherein said elements communicate with each other using a link state protocol, the method comprising:
   receiving a link state message from a neighboring second network node element by a first network node element, the link state message identifying link states for a plurality of network node elements;
   the first network node element comparing one of the link states in the link state message with a stored link state of one of the network node elements to determine if the link state in the link state message for that network node element differs from the stored link state for that network node element;
   if the link state in the link state message for the one of the network node elements differs from the stored link state for that network node element, the first network node element determining that that network node element is inaccessible.

2. The method as claimed in claim 1, wherein the stored link state is maintained in a topology database.

3. The method as claimed in claim 2, wherein the topology database is maintained in the first network node element.

4. The method as claimed in claim 2, wherein the topology database is maintained in a central network element.

5. The method as claimed in claim 1, further comprising:
the first network node element confirming that the network node element determined to be inaccessible is inaccessible.

6. The method as claimed in claim 1, further comprising: recalculating a topology based on neighboring available network node elements and taking account of the network node element that is inaccessible without awaiting expiration of a dead interval on the basis of periodic link messages.

7. A network node element having a computer program product stored on non-transitory memory to operate on the network node element and having instructions to be executed by a processor of the network node element, the instructions when executed comprising the steps of:
receiving a link state message from a neighboring second network node element by the network node element;
comparing link states in the link state message with stored link states of neighboring network node elements;
determining whether a link state in the link state message exactly matches the stored link state for one of the neighboring network node elements in response to the comparison; and
evaluating the compared link states to determine if a neighboring network node element has suffered an outage and is no longer available in response to a determination that the compared link states are not exactly matching; and
wherein the stored link states are maintained in a topology database.

8. A network node element, provided for communicating with other network node elements in accordance with a link state protocol, comprising:
a receiver for receiving a link state message from a neighboring network node element, the link state message identifying link states for a plurality of neighboring network node elements; and
a comparator for comparing a link state of one of the neighboring network node elements in the link state message with a stored link state of that neighboring network node element; and
if the link state in the link state message for at least one of the neighboring network node elements differs from the stored link state for that at least one neighboring network node element:
the network node element determining that the at least one neighboring network node element has suffered an outage and is inaccessible.

9. The network node element as claimed in claim 8, wherein the network node element is a router.

10. The network node element as claimed in claim 9, wherein IS-IS protocol is the link state protocol.

11. The network node element as claimed in claim 9, wherein OSPF protocol is the link state protocol.

12. The method of claim 1, wherein the network node element determined to be inaccessible is inaccessible as a result of an outage and wherein the link state message describes a link state of a plurality of network node elements and wherein the network node elements are routers.

13. The network node element of claim 8, wherein the network node element confirms that the at least one neighboring network node element determined to be inaccessible is inaccessible by sending at least one hello message to the at least one neighboring network node element.

14. The network node element of claim 7 wherein the instructions further comprise the step of the network node element confirming that the neighboring network node element determined to be inaccessible is inaccessible by sending at least one hello message to the neighboring network node element.

15. The method of claim 5 wherein the confirming that the network node element determined to be inaccessible is inaccessible comprises the first network node element sending at least one hello message to the network node element determined to be inaccessible.

* * * * *